US00RE36659E

United States Patent [19]

Toogood

[11] E Patent Number: Re. 36,659

[45] Reissued Date of Patent: Apr. 18, 2000

[54] CHIPPER WITH DETACHABLE FACING KNIVES

[75] Inventor: William C. Toogood, Beaverton, Oreg.

[73] Assignee: Key Knife, Inc., Tualatin, Oreg.

[21] Appl. No.: 09/161,696

[22] Filed: Aug. 26, 1998

Related U.S. Patent Documents

Reissue of:

[64] Patent No.: 5,709,255
Issued: Jan. 20, 1998
Appl. No.: 08/733,809
Filed: Oct. 18, 1996

[51] Int. Cl.[7] ..... B27C 9/00

[52] U.S. Cl. ..... 144/220; 144/218; 144/241; 407/46; 407/101

[58] Field of Search ..... 144/39, 41, 218, 144/220, 223, 235, 241; 407/37, 40, 41, 45, 46, 87, 95, 101, 104

[56] References Cited

U.S. PATENT DOCUMENTS 3,360,024 12/1967 Traben .
4,263,949 4/1981 Kivimaa .
4,266,584 5/1981 Lomnicki .
4,269,244 5/1981 Kinsella .
4,456,045 6/1984 Gregoire .
4,499,934 2/1985 Rautio .
4,793,390 12/1988 Stroud .
4,984,614 1/1991 Landers et al. .
5,271,442 12/1993 Carpenter et al. .
5,511,597 4/1996 Shantie et al. .

*Primary Examiner*—W. Donald Bray
*Attorney, Agent, or Firm*—Kolisch, Hartwell, Dickinson, McCormack & Heuser

[57] ABSTRACT

A rotary chipping head with multiple knife structures distributed about its periphery. Each knife structure includes an end-located chipping knife with a cutting edge movable in a plane disposed perpendicular to the axis of rotation of the chipping head. End-located facing knives are interspersed with the knife structures for producing a smooth face in the work being processed. Anvils preceding the facing knives produce compression in the work being processed. Detachable facing elements mount the facing knives and the anvils.

25 Claims, 5 Drawing Sheets

CHIPPER WITH DETACHABLE FACING KNIVES

Matter enclosed in heavy brackets [ ] appears in the original patent but forms no part of this reissue specification; matter printed in italics indicates the additions made by reissue.

BACKGROUND AND SUMMARY OF THE INVENTION

This invention relates to woodworking machines, as exemplified by apparatus known in the industry as a log-slabbing chipper.

A log-slabbing chipper typically includes a power-rotated head disposed to one side of a support for a log. The head supports knife structure on its periphery which operates on rotation of the head to chip-off wood material on a log with relative movement of the head with respect to a log there-adjacent. The knife structures on the chipper head are rotated against a side of the log to produce the chipping action. Each knife structure includes one edge portion (a chip-cutting edge portion) which extends axially along the power-rotated head which functions to cut off the major portion of the chips produced by the apparatus as the edge portion is rotated and moved along a side of a log. In a typical log-slabbing chipper, this edge portion extends axially and also slopes inwardly toward the axis of the head, so that the edge portion moves in a conical path. Other chippers are known where the edge portion as described moves in a substantially cylindrical path.

A knife structure may further include what is sometimes referred to as a planing edge portion, which moves in a plane disposed perpendicular to the rotation axis of the chipper and which produces a flat surface on the log being processed as chips are cut off by the action of the chip-cutting edge portions in the knife structures. In addition to producing a flat surface on the log being processed, it is economically advantageous if the planing edge portions just described also produce useable chip material while performing the cutting action desired.

In log-slabbing chippers heretofore known, the flat face produced in the log as a result of the chipping action typically has not been truly smooth, meaning that the face has to be further processed if the face is to be present in a finished piece of lumber.

Thus, a general object of this invention is to provide improvements in a log-slabbing chipper with knife cutting edges present functioning to produce greater smoothness in the flat face of a log processed by the chipper than possible with prior known constructions.

Another object is to provide a chipper which produces greater smoothness in the flat face cut in a log, and which utilizes cutting edges operable to produce useful chip material while at the same time producing the smoothness required in the surface.

It is recognized that for maximum utility, a degree of flexibility is desirable in the operation of a chipping head. Further explaining, in certain operations the degree of smoothness obtained in the finish of a face in the log need not be as great as in other types of operations. In fact, some lumber users might even desire a rough cut, or sawn appearance in the finish of a log, as the result of the chipping action. To obtain different surface characteristics when a log face is being processed, the log-slabbing chipper of the instant invention features removable and replaceable end-cutting structures at the work-confronting face of the chipper, which affords a relatively easy method of obtaining different types of finish in the product processed, depending upon the type of cutting structure which is placed in operative position at the work-confronting face of the chipper.

A further object of the invention, therefore, is to provide a log-slabbing chipper which is modifiable in a relatively simple manner to obtain different types and styles of finish in the flat face produced by the chipper when such is operated.

A further feature and object of the invention is to provide an improved log-slabbing chipper which relies upon replaceable double-edged knives for producing the cutting action in the chipper. With dulling of a knife edge, a double-edged knife is easily turned about to present an opposite cutting edge for cutting purpose. With both edges in a knife dulled through use, a knife may be easily removed and replaced with a knife having sharpened edges. With presharpened double-edge knives, far greater accuracy is obtainable in the positioning of a cutting edge.

BRIEF DESCRIPTION OF THE DRAWINGS

These and other objects and advantages are obtained by the invention, which is described herein below in conjunction with the accompanying drawings, wherein.

DETAILED DESCRIPTION OF THE PREFERRED EMBODIMENT

Figure 1:
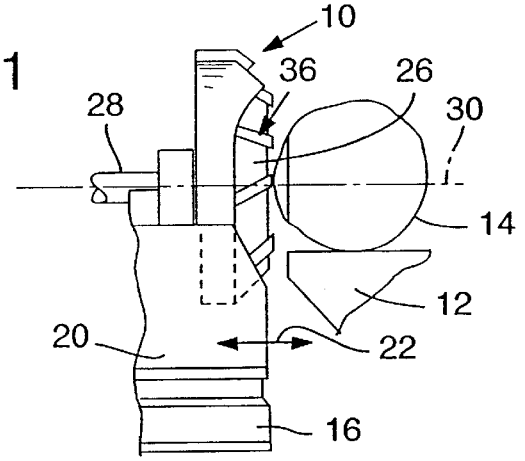
FIG. 1 illustrates, in simplified form, a log-slabbing chipper which may include the construction contemplated by the present invention.

Referring now to the drawings, a log-slabbing chipper is illustrated in simplified form in FIG. 1 at 10. The chipper or woodworking machine includes a carriage 12 or log-supporting means, which mounts a log 14, with the log and carriage being movable in a direction extending longitudinally of the log (or toward and away from the viewer as the log and carriage are illustrated in FIG. 1).

Supported to one side of the carriage, on a frame 16 suitably mounted on the ground, is a stand 20. The stand is mounted for movement in the lineal path along the frame toward and away from the log, or in the direction indicated by the arrow 22 in FIG. 1.

Rotatably supported on stand 20 is a power-driven chipping head 26. The chipping head is rotated under power, about an axis 30, by suitable means, such as belts, or a motor connected to shaft 28.

Distributed about axis 30 on the chipping head are multiple knife structures given the reference numeral 36. With the chipping head rotated under power, and with a log such as log 14 moved across the end face or work-confronting face of the chipping head, cutting edges on the knife structures 36 function to chip and cut away material on the log to produce a flattened side extending along the log. A log-slabbing chipper of this description is fully described in prior-issued U.S. Pat. No. 5,271,442.

Figure 2:
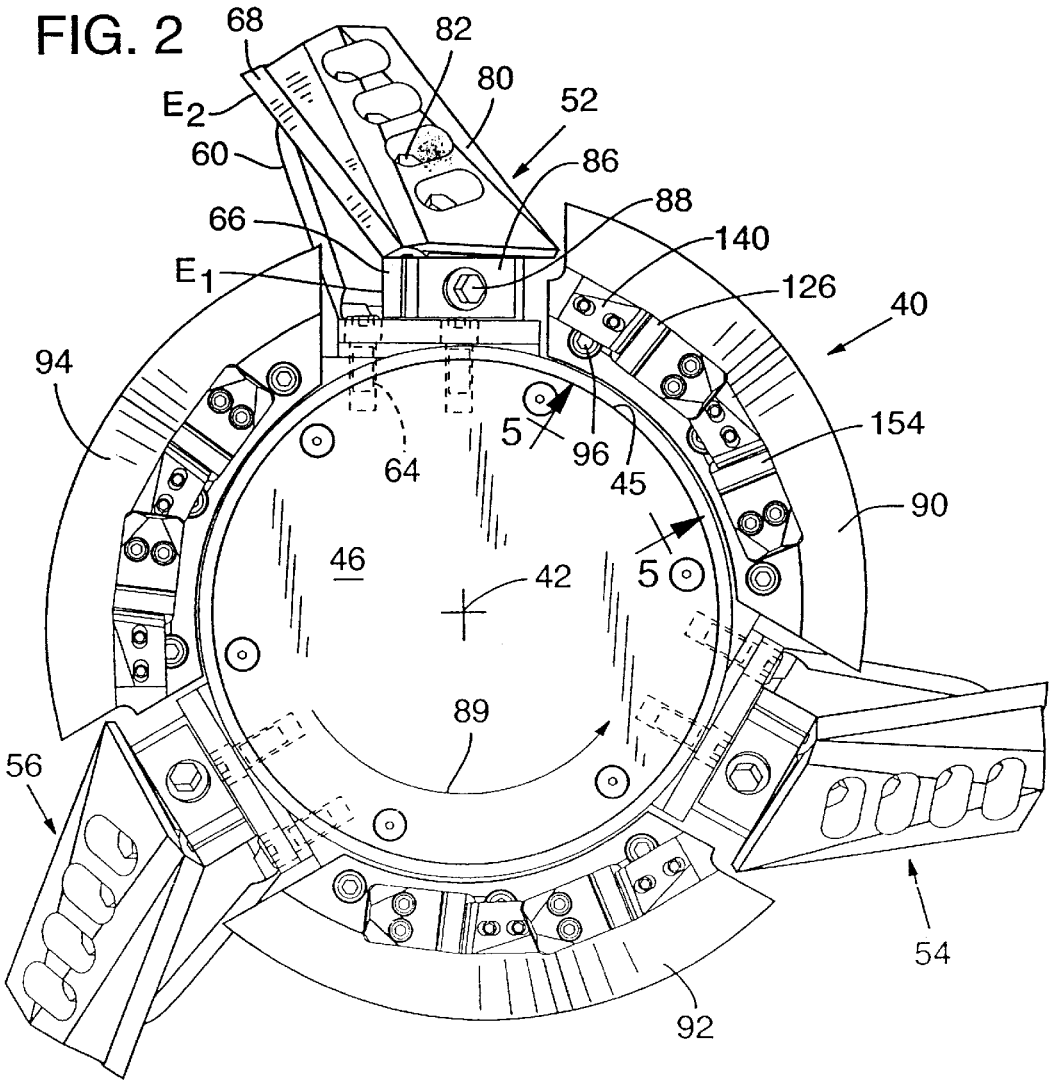
FIG. 2 is an end view of a chipping head constructed as contemplated by a preferred embodiment of the invention.
Figure 3:
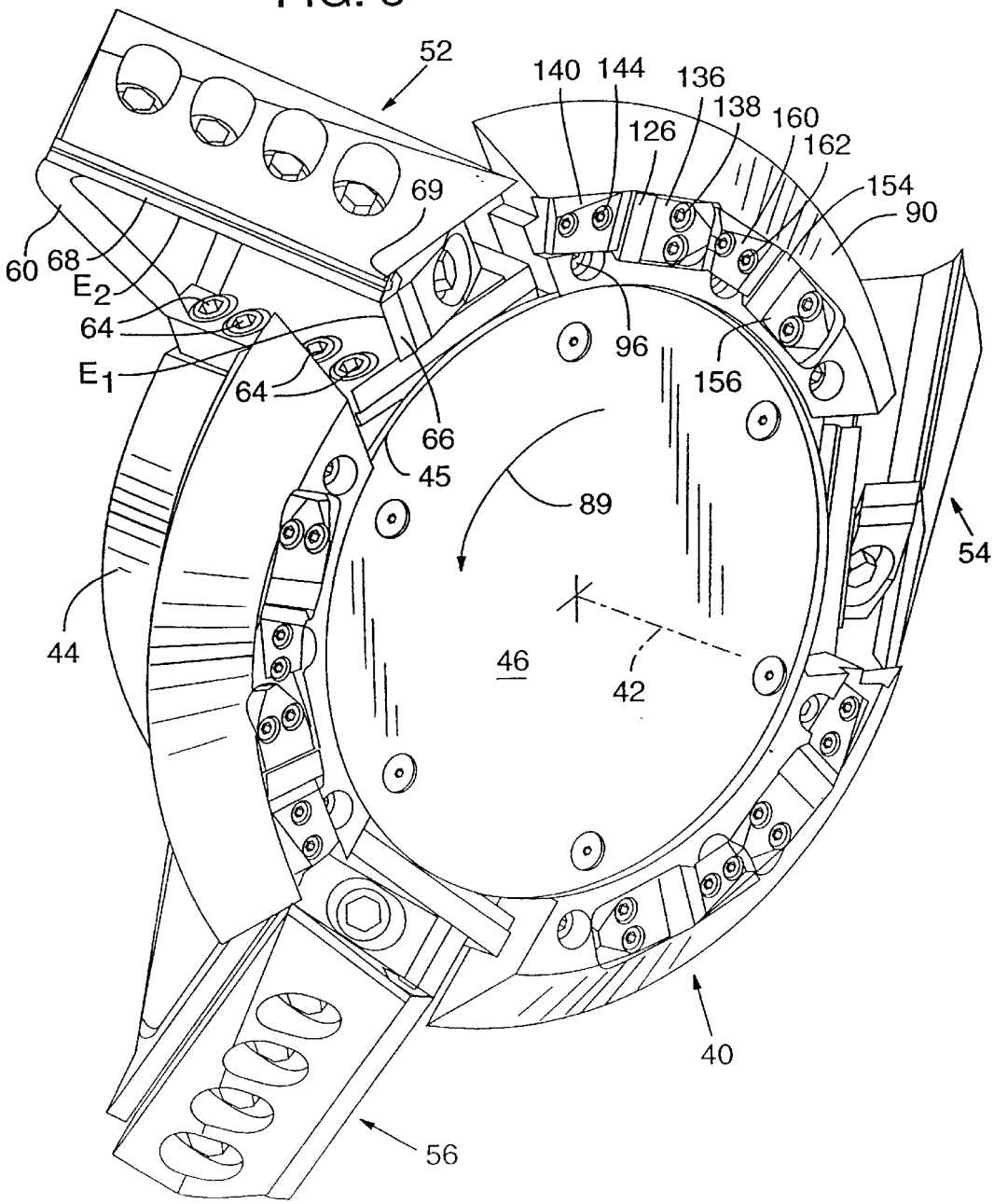
FIG. 3 is a perspective view of portions of a chipping head.
Figure 4:
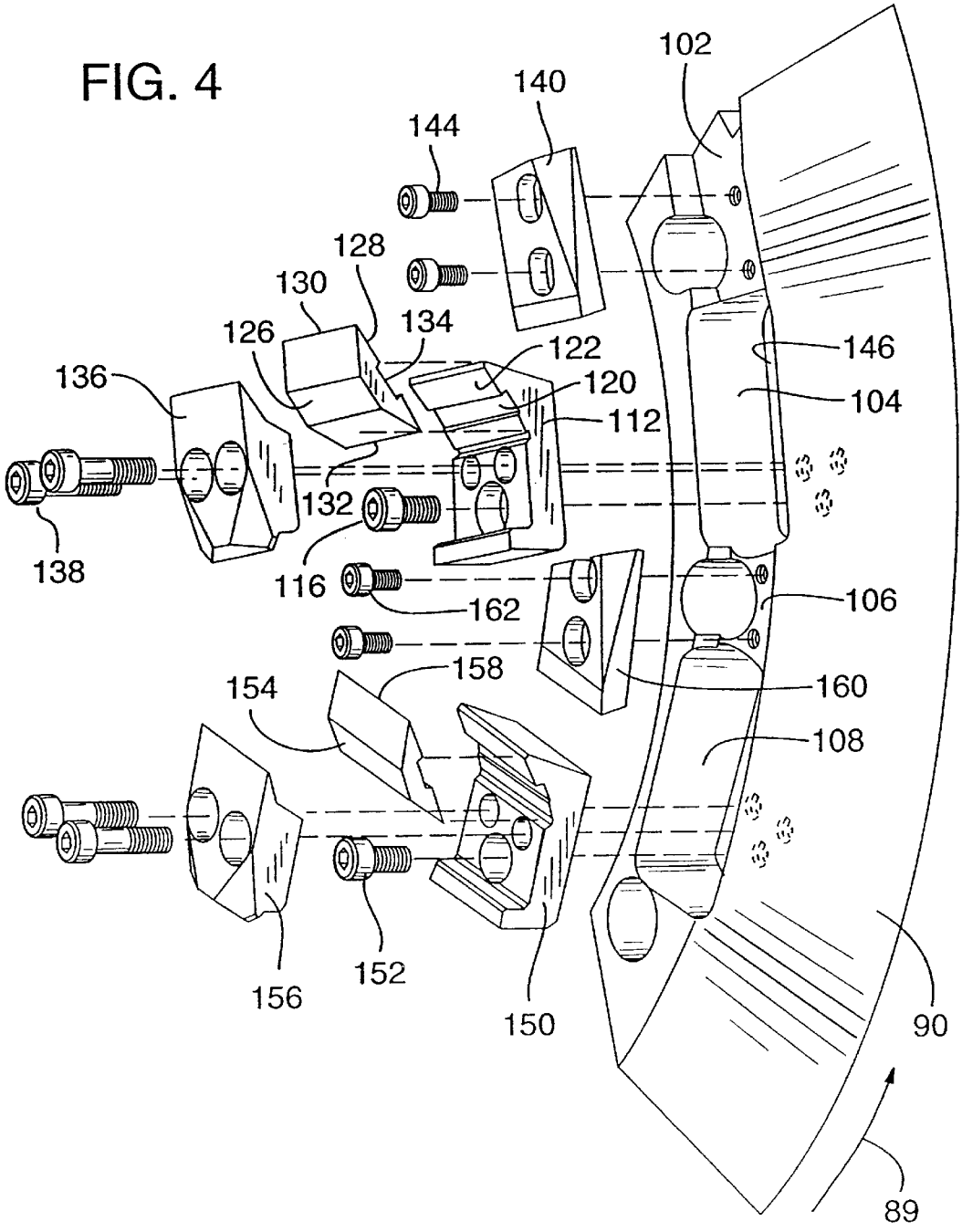
FIG. 4 is a exploded view of portions of a chipping head.
Figure 5:
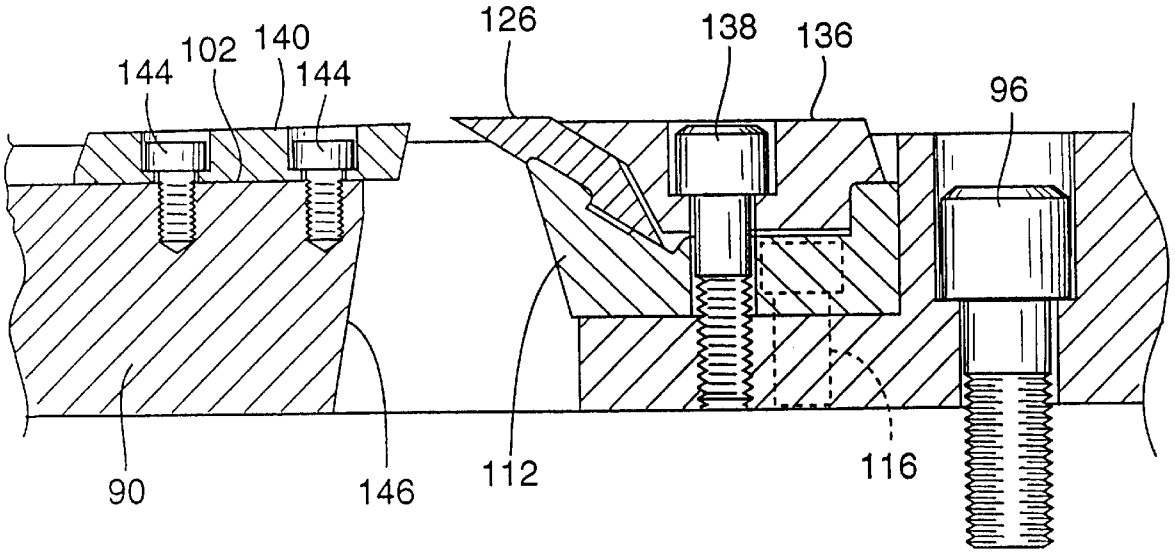
FIG. 5 is a cross-sectional view, taken generally along the line 5—5 in FIG. 2.

Describing now with more particularity the chipping head of the instant invention, and referring to FIGS. 2, 3 and 4, the chipping head is illustrated in the drawings at 40. With operation of the head, the head is rotated under power about an axis 42. The chipping head includes a chipping head body 44. This chipping head body presents a face 46 at one end thereof which delineates the end of the body and which extends generally normal to axis 42. This face 46 is the work-confronting face of the chipping head body.

The chipping head body has a periphery which extends about axis 42 and which is disposed in an axial direction inwardly from face 46. Detachably mounted on the periphery of body 44, and equally circumferentially distributed about axis 42, are knife structures, indicated generally at 52, 54 and 56. While three knife structures are provided in the particular embodiment of the chipping head herein described, obviously this number may be varied depending upon the use to which the chipping head is to be put.

Each knife structure, and reference is made to knife structure 52, includes a holder 60 which is detachably mounted through its base and by fasteners 64 to the chipping head body. Detachably mounted on this holder 60 are a pair of knives, shown at 66 and 68. Knife 66 presents a cutting edge E1 disposed in a plane which is perpendicular to the axis 42 of the chipping head. Knife 68 presents an edge E2 which is considerably longer than edge E1 and disposed at an obtuse angle with respect to edge E1.

With rotation of the cutting head, edge E1 cuts a relatively flat surface on the log or workpiece being processed. In the past, such edge, because of its smoothing action, has been sometimes referred to as a planing edge. The edge is part of a knife which has its front face 69 disposed at a relatively sharp acute angle (typically from 20 to 35 degrees) with respect to the work-confronting face of the chipping head. In addition to smoothing, the knife functions to cut useable wood chip material from the log or workpiece. As a consequence, knife 66 is also referred to herein as an end-located chipping knife (since the knife is located on the end of the chipping head).

Knife 68 with edge E2 is the major producer of chips with a log advanced into the chipping head as the head is rotated. Being located on the side of the chipping head, the knife may also be referred to herein as a side-chipping knife, or side-located chipping knife. Edge E2 of this side chipping knife extends axially with respect to the chipping head, albeit at an angle, whereby the edge slopes downwardly toward and across the axis of the chipping head progressing in a direction toward end face 46.

As earlier discussed herein, included in the objects of this invention is the provision of a chipping head having knives organized in the chipping head so as to produce greater smoothness in the flat face produced in the log being processed. Further, these knives are easily replaced, thus facilitating the replacement of a dull cutting edge with a sharp one when the need arises for such replacement.

Reference is made to prior issued U.S. Pat. No. 5,271,442 wherein a knife structure like knife structure 52 is discussed in greater detail. As disclosed in this patent, the knives 66 and 68 having cutting edges E1 and E2 may each be double-edged knives, each being bounded along opposite margins by a pair of knife edges. Each has a front face which, in the case of knife 68, faces radially inwardly and generally toward the axis of the chipping head, and which in the case of knife 66 faces axially inwardly on the chipping head. Each knife is clamped securely in place on the holder, in the case of knife 68 by a clamp 80 secured in place with fasteners 82, and in the place of knife 66 by a clamp 86 secured in place by a fastener 88.

By providing knives that are double-edged, upon the exposed operative cutting edge of a knife through use becoming dull, such is readily replaced by turning the knife about to place the other of its two cutting edges in an operative position. Further explaining, should edge E1 of knife 66 need replacement, clamp 86 may be removed and the knife with edge E1 turned about while keeping its front face facing axially inwardly to replace edge E1 with the knifes' opposite cutting edge. In the case of knife 68, clamp 80 is removed and knife 68 turned about while keeping its front face facing the axis of the chipping head, to replace E2 with the other sharpened edge which the knife includes.

The three knife structures 52, 54, 56 in the chipping head herein disclosed are equally circumferentially distributed about the axis of the chipping head. Face 46 located centrally of these knife structures is part of a face plate or wear plate 45 provided at the end of the chipping head. This wear plate is suitably mounted on the chipping head body, with this mounting usually mounting the plate in a fixed position at the end of the chipping head. Other mountings are known, with one type of mounting, for instance, providing for rotation of the wear plate about axis 42 of the chipping head for the purpose of reducing frictional drag when the chipping head is rotated against a log. For the purpose of this description it is sufficient to assume that a fixed type mounting is provided.

When the chipping head is rotated under power to perform work, i.e., in a operative direction, such is rotated in a counterclockwise direction in FIGS. 2 and 3, or in the direction of arrow 89.

Extending in an arcuate sweep between each of the knife structures is what is referred to herein as a facing segment. These are indicated in the drawings at 90, 92 and 94. These are located radially outwardly of face plate 45, and are detachably mounted on the chipping head body, as with the fasteners indicated at 96.

The facing segments or elements provide for the mounting of what are referred to herein as facing knives which function to cut or shave off wood material and produce a smooth face in the workpiece being processed. The smoothness obtainable is considerably greater than that obtainable when relying only upon the end-located knives. Also associated with the facing knives are so-called anvil portions or members, which function to exert a slight pressure on the face of the workpiece or log prior to the face being cut by a facing knife, with, as a consequence, a smoother cut resulting.

Further explaining, and also referring to FIG. 4, and considering facing element or segment 90 extending between knife structures 54 and 56, the facing element is provided at its upper end with a dished out portion 102. Joining with dished out portion 102 is a pocket 104, another dished out portion 106, and a pocket 108.

A knife mounting or counterknife 112 seats within pocket 104. Mounting 112 is detachably secured in place as with a fastener 116.

The upper end of the knife mounting, as the mounting is viewed in FIG. 4, is provided with a grooved area 120 adjacent a shallow ridge 122. This provides a mounting region for a double-edged facing knife fitted thereagainst, as exemplified by facing knife 126.

Knife 126 has a essentially flat front face 128 and knife edges 130, 132 extending along opposite margins. A channel or groove 134 extends along face 128 midway between edges 130 and 132. The knife is symmetrical about a plane bisecting the knife extending normal to face 128. The knife may be similar in cross section to the knife having edge E1 of a knife structure, and similar to the double-edged knifes described in prior issued U.S. Pat. No. 5,271,442.

Knife 126 sits on the knife support with its channel 134 fitting over ridge 122. Securing the knife in place in this seated position is a knife clamp 136 secured in place as with fasteners 138. When mounted, one of the knife's edges, as exemplified by edge 130, occupies an exposed operative position.

Detachably mounted in place in dished out portion 102, in advance of the knife as the cutter head is moved, is an anvil element 140. The anvil element is secured in place with fasteners 144.

In the region of cutting edge 130 of the knife, where such trails the anvil element, and extending inwardly on the facing element, is a chip discharge passage 146. Such extends through the facing element and provides for the passage therethrough of material cut away from the log or workpiece by the knife.

Seating within pocket 108 is a knife mounting 150 similar to mounting 112. The mounting is held in place with a fastener 152. A facing knife 154 similar to knife 126 is supported on knife mounting 150. Clamping the knife in place is a knife clamp 156. The facing knife is supported with one of its cutting edges 158 in operative cutting position.

Detachably mounted in dished out portion 106 is an anvil element 160. Securing the anvil element in place are fasteners 162.

When the chipping head is rotated under power to perform work, the exposed edges of the facing knives trail cutting edge E1 of the end-located chipping knife.

Figure 6:
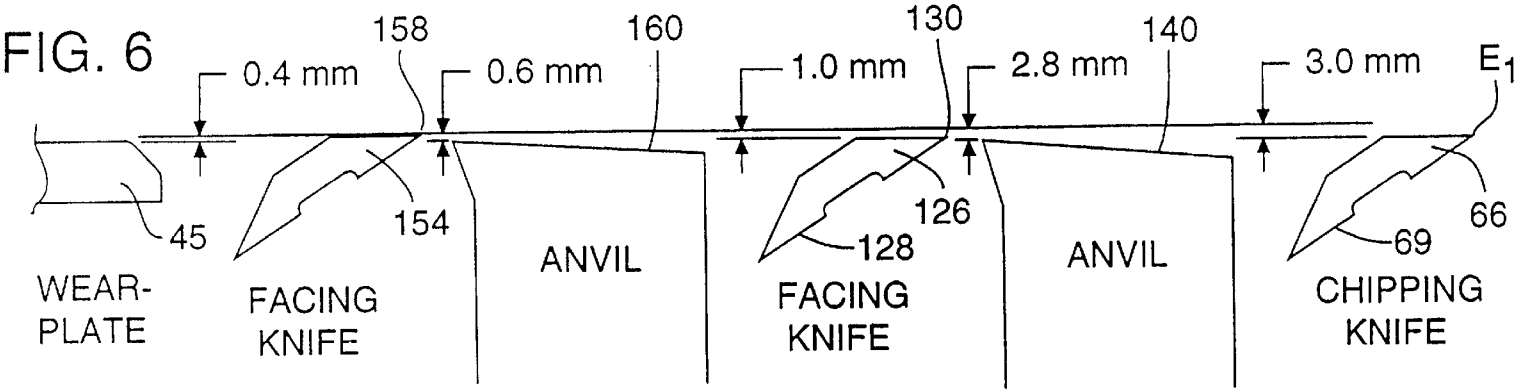
FIG. 6 is a diagrammatic illustration showing how knives in the chipping head operate to produce a proper finish in the workpiece being processed.

Reference is now made to FIG. 6 which illustrates diagramatically the cutting action of the end-located chipping knife and the facing knives that follow it. Referring to this figure, it will be remembered that when cutting chip material from a log, the log is advanced across the rotating chipping head with the chipping head at the same time being rotated at relatively high speed, so that the knives in the knife structures cut chip material. In a typical operation, and with a normally encountered feed speed in the log and rotational speed in the chipping head, the end-located chipping knife might be positioned with its operative exposed cutting edge E1 a distance of 3 millimeters axially inwardly on the chipping head from the plane of the face or wear plate 45. The front face 69 of the chipping knife 66 extends at an acute angle with respect to the plane of the face, plate typically at an angle ranging from 25 to 35 degrees, i.e., at an angle of less than 45 degrees.

Facing knife 126 which follows the end-located chipping knife has its operative cutting edge 130 more closely adjacent the face of the wear plate. In the illustration of FIG. 6, the spacing of edge 130 from the plane of the wear plate is 1 millimeter. Again, the front face of the facing knife is set at an acute angle with respect to the plane of the wear plate. The angular position of facing knife 126 is similar to the angular position of the end-located chipping knife.

The cutting edge 158 of facing knife 154 is positioned at an even closer spacing to the plane of the wear plate. In the illustration of FIG. 6, the distance of this edge from the plane of the wear plate is only 0.4 millimeters. The inclination of the facing knife may be essentially the same as the inclination of facing knife 126.

When the chipping head is rotated, the region of the flattened side produced in the log with cutting of the chip material advances into the chipping head as chipping progresses. As a consequence, knife edge 130 of facing knife 126, if it is to cut and smooth the wood region cut by edge E1 immediately in advance of the facing knife, must be located slightly radially inwardly on the chipping head from the position of edge E1 of knife 66. For the same reason, edge 158 of facing knife 154 that trails facing knife 126 must be mounted slightly radially inwardly from edge 130. As a consequence, and as can be seen by viewing FIG. 2, the knives 126 and 154 are disposed along a path that spirals inwardly from knife 66, having edge E1.

It will be recognized that in different mills and in different installations the speed with which a log is advanced and the speed with which the chipping head is rotated will be subject to variation. It is for this reason that an organization is selected wherein the facing knives and their knife mountings are detachably supported on a detachable facing element or segment. With removal and replacement of a facing element or segment, a different positioning of the pockets and dished out portions may be selected, which is an effective to vary the extent that edges 130, 158 do not exactly trail each other or trail edge E1.

Figure 7:
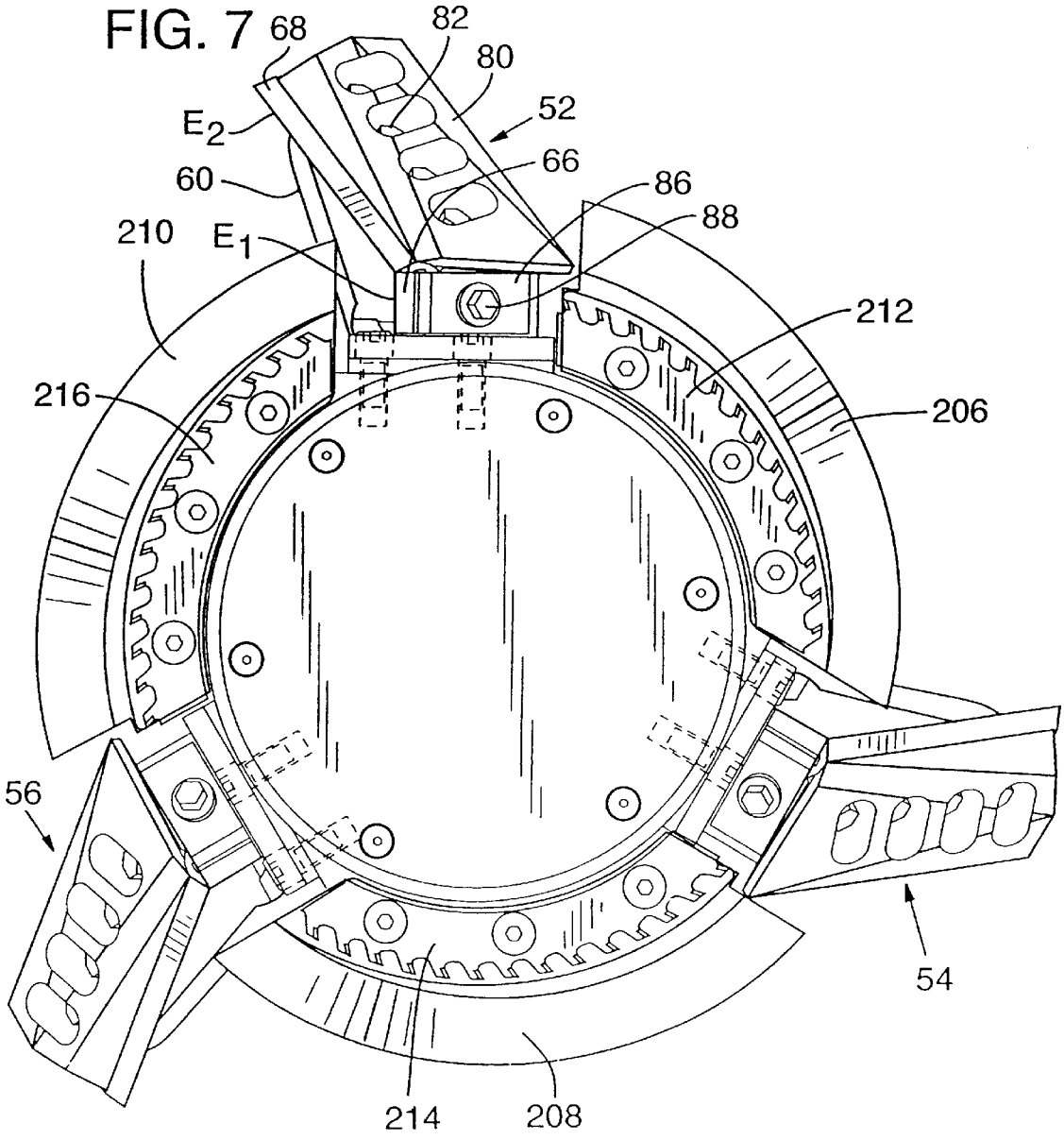
FIG. 7 illustrates a modified chipping head modified to produce a different type of finish in the workpiece processed.

In some installations, a rough sawn look might be desired to be imparted to the flat face produced in the log processed. In this instance, the facing segments 90, 92, 94 may be removed, together with the knife mountings, anvils and knives that are supported on these segments. As replacements, facing segments as shown in FIG. 7 might be utilized, as exemplified by facing segments 206, 208 and 210. Referring to FIG. 7 each of these facing segments has detachably secured against the outer face thereof, a saw segment, as exemplified by saw segments 212, 214 and 216. When facing segments with such saw segments are detachably mounted in place on the end of the chipping head, the facing action which is imparted to the workpiece is not a smoothing one, but instead a roughening one operable to produce a rough sawn appearance in the flat surface of the log or workpiece processed.

While various modifications and arrangements of the invention have been described it should be obvious that other variations and modifications are possible without departing from the invention.

It is claimed and desired to secure by letters patent:

1. A rotary chipping head comprising:

a chipping head body mountable for rotation about an axis in an operative direction, said body having a face at one end thereof delineating the end of the body and said face extending generally normal to said axis and said body having an outer periphery extending about said axis disposed in an axial direction inwardly from said face, knife structure detachably mounted on the periphery of said body having one cutting edge extending in an axial direction and effective to cut chips from a workpiece as a workpiece is advanced into the knife structure and a second cutting edge producing a cut in the workpiece in a plane disposed perpendicular to said axis, an end-located facing knife mounted on said end of said body having a third cutting edge disposed normal to the axis of said body for producing a facing cut in a workpiece which trails the cut produced by the second cutting edge, with said body rotated in an operative direction, *the third cutting edge being axially displaced from the second cutting edge,* and an anvil portion mounted on the end of said body disposed in a circumferential direction intermediate the said second and third cutting edges operable to press against the workpiece immediately prior to the workpiece being cut by said third cutting edge.

2. The chipping head of claim 1, wherein the end-located facing knife and anvil portion are mounted on a common facing element which is detachably and removably mounted on the end of the chipping head body.

3. The chipping head of claim 2, wherein the end-located facing knife is detachably mounted on the facing element.

4. The chipping head of claim 1, wherein the end-located facing knife has a front face that faces inwardly on the end of the chipping head body and which is disposed at an acute angle of less than 45-degrees with respect to said face of the cutter head body.

5. The chipping head of claim 4, wherein the end-located facing knife is a double-edged knife, and includes a pair of oppositely disposed knife edges, either one of which is positionable as a third cutting edge.

6. The chipping head of claim 1, wherein the facing knife and anvil portion are mounted on a common first facing element which is detachably and removably mounted on the end of the chipping head body, and which further includes a detachably and removably mounted second facing element adapted to be mounted on said chipping head body as a replacement for said first facing element, said second facing element having a saw-type cutter mounted thereon for producing a rough cut in a workpiece.

7. A rotary chipping head comprising:

a chipping head body mountable for rotation about an axis in an operative direction, said body having a face at one end thereof delineating the end of the body and said face extending generally normal to said axis and said body further having an outer periphery extending about said axis disposed in an axial direction inwardly from said face, multiple knife structures detachably mounted on the periphery of said body with the knife structures being distributed in a circumferential direction about the periphery of said body, each knife structure having one cutting edge extending in an axial direction and effective to cut chips from a workpiece as a workpiece is advanced into said structure and a second cutting edge extending normal to said axis producing a cut in the workpiece in a plane disposed perpendicular to said axis, and an end-located facing knife associated with each of said knife structures mounted on said end of said body having a third cutting edge disposed normal to the axis of said body for producing a facing cut that trails the cut produced in a workpiece by the second cutting edge of the knife structure associated therewith, with said body rotated in an operative direction, *the third cutting edge being axially displaced from the second cutting edge.*

8. The rotary chipping head of claim 7, which further includes an anvil portion mounted on the end of said chipping head body intermediate each knife structure and the end-located knife associated with the knife structure for pressing against the workpiece prior to being cut by the third cutting edge of an end-located knife.

9. The rotary chipping head of claim 7, wherein each end-located facing knife is a double-edged knife, and includes a pair of oppositely disposed knife edges, either one of which is positionable as a third cutting edge.

10. A rotary chipping head comprising:

a chipping head body mountable for rotation about an axis in an operative direction, said body having a face at one end thereof delineating the end of the body and said face extending generally normal to said axis and said body having an outer periphery extending about said axis disposed in an axial direction inwardly from said face, multiple knife structures detachably mounted on the periphery of said body equally circumferentially distributed about the periphery of said body, each knife structure including one cutting edge extending in an axial direction and effective to cut chips from a workpiece as a workpiece is advanced thereinto and a second cutting edge for producing a cut in the workpiece in a plane disposed normal to said axis, and a pair of trailing end-located knives associated with each of said knife structures, one of said end-located knives in a said pair having a third cutting edge disposed normal to the axis of said body for producing a facing cut in a workpiece that trails the cut produced by said second cutting edge, and the other of said end-located knives in said pair having a fourth cutting edge disposed normal to the axis of said body for producing a facing cut in a workpiece that trails the cut produced by said third cutting edge, *the third and forth cutting edges being axially displaced from the second cutting edge and from each other.*

11. The rotary chipping head of claim 10, which further includes an anvil portion mounted on the end of said chipping head associated with each knife structure which contacts the workpiece with rotation of the workpiece immediately in advance of said third cutting edge and which is operable to press against the workpiece prior to being cut by the third cutting edge.

12. The rotary chipping head of claim 11, wherein said pair of end-located knives and said anvil portion are mounted on a common facing element which is detachably mounted on the end of said chipping head body.

*13. A rotary chipping head comprising:*

*a chipping head body mountable for rotation about an axis in an operative direction,*

*said body having a face at one end thereof delineating the end of the body and said face extending generally normal to said axis and said body further having an outer periphery extending about a perimeter of said face,*

*a side-chipping knife detachably mounted about the periphery of said body, the side-chipping knife having a first cutting edge extending at an angle relative to said axis away from said face and effective to cut chips from a workpiece as the workpiece is advanced into said side-chipping knife, and*

*at least two end-located knives associated with the side-chipping knife, said two end-located knives having second and third cutting edges, respectively, disposed in axially offset planes, said planes being generally normal to the axis of said body whereby the second and third cutting edges produce facing cuts in the workpiece which are axially offset from one another with said body rotated in an operative direction.*

*14. The chipping head of claim 13, further comprising a third end-located knife associated with the side-chipping knife, the third end-located knife having a fourth cutting edge disposed in a plane axially offset from the planes associated with the second and third cutting edges and.*

*15. The chipping head of claim 14, wherein the third cutting edge is positioned radially inwardly toward the axis relative to the second cutting edge, and the fourth cutting edge is positioned radially inwardly toward the axis relative to the third cutting edge.*

*16. The chipping head of claim 15, wherein the third and fourth cutting edges are radially positioned to substantially trail the cut produced by the second cutting edge in view of the rate at which the workpiece is advanced and the speed at which the chipping head is rotated.*

*17. The chipping head of claim 16, wherein the third end-located knife and the end-located knife with the third cutting edge are mounted on a common facing element which is detachably mounted to the end of the chipping head body, whereby different facing elements can be selectively mounted to the chipping head body to adjust the positions of the third and fourth cutting edges to accommodate different advance rates for the workpiece and different head rotation speeds.*

*18. The chipping head of claim 13, wherein the third cutting edge is positioned radially inwardly toward the axis relative to the second cutting edge.*

*19. The chipping head of claim 18, wherein the third cutting edge is positioned to substantially trail the cut produced by the second cutting edge in view of the rate at which the workpiece is advanced and the speed at which the chipping head is rotated.*

*20. The chipping head of claim 13, further comprising an anvil portion mounted on the end of said chipping head body at a circumferential position intermediate the second and third cutting edges and being operable to press against the workpiece immediately prior to the workpiece being cut by the third cutting edge.*

*21. The chipping head of claim 20, wherein the anvil portion and the end-located knife having the third cutting edge are mounted on a common facing element which is detachably mounted to the end of the chipping head body.*

*22. The chipping head of claim 21, wherein the end-located knife having the third cutting edge is detachably mounted on the common facing element.*

*23. The chipping head of claim 21, wherein the end-located knife having the third cutting edge and the anvil portion are mounted on the common facing element which is selectively attachable on the end of the chipping head body, and which further includes a second facing element selectively attachable on said chipping head body as a replacement for said first facing element, said second facing element having a saw-type cutter mounted thereon for producing a rough cut in the workpiece.*

*24. The chipping head of claim 13, wherein each of the end-located knives has a front face that faces inwardly on the end of the chipping head body and which is disposed at an acute angle of less than 45-degrees with respect to the face of the chipping head body.*

*25. The chipping head of claim 24, wherein the end-located knives each include a pair of opposed knife edges, either one of which is positionable as a cutting edge.*

* * * * *